UNITED STATES PATENT OFFICE.

ERNST WILHELM ENGELS, OF ESSEN, GERMANY.

FIRE AND ACID PROOF MATERIAL AND PROCESS OF MAKING SAME.

SPECIFICATION forming part of Letters Patent No. 650,040, dated May 22, 1900.

Application filed December 12, 1898. Serial No. 699,057. (Specimens.)

*To all whom it may concern:*

Be it known that I, ERNST WILHELM ENGELS, a subject of the King of Prussia, German Emperor, residing at Essen-on-the-Ruhr, Germany, have invented certain new and useful Improvements in or Relating to Fire and Acid Proof Materials and Processes of Making Same, of which the following is a specification.

This invention relates to improvements in processes of rendering various materials fire and acid proof and the product thereof.

The means at present in use for manufacturing fireproof material or rendering substances fire and acid proof consist in forming or applying a varnish or enamel on bricks, plates, or other material to be rendered fireproof.

My process of rendering material fireproof consists in covering or forming on with the aid of electricity the surfaces of such material with "carbids" of any kind—such, for instance, as carborundum—and thus producing a fire and acid proof surface.

The fireproof or acid-proof material may be produced by covering the surface of such material by electrical means with carborundum or other carbid melted or fused onto it, the carbid being employed when in its finished state or being produced during the fusing by using the necessary ingredients.

For producing the fire and acid proof surface on bricks, &c., by the use of carborundum or other carbid in a finished state the bricks are covered with the carbid, and the same are then subjected to the action of the electric arc of the required intensity, (about one hundred and ten volts and two hundred amperes being sufficient,) whereby the carbid will be fused and unite with the material of the bricks. When using the materials from which carborundum is produced—*i. e.*, sand and charcoal—these ingredients will be made to cover the surfaces of the bricks and then are subjected to the action of the electric arc of the required intensity, such as above described, whereby the ingredients will be fused together, forming carborundum, and the latter thereby uniting with the material of the bricks.

The materials of which the bricks or the like to be treated may be composed may of course vary. For instance, the usual materials of which bricks are made, containing silicious or clayey substances, may be used.

I claim—

1. The herein-described process of fireproofing and rendering acid-proof various materials which consists in covering the surface or surfaces of the material to be treated with carborundum, and then subjecting the latter to the action of an electric arc of sufficient intensity to cause the carborundum to be fused as set forth.

2. A brick or slab of refractory material other than carborundum provided with a fire and acid proof coating of carborundum having intimate fusion with the material of the brick.

In witness whereof I have hereto set my hand in the presence of the two subscribing witnesses.

ERNST WILHELM ENGELS.

Witnesses:
EWALD ENGELS,
MAX ENGELS.